US007269525B1

(12) United States Patent
Gough et al.

(10) Patent No.: US 7,269,525 B1
(45) Date of Patent: Sep. 11, 2007

(54) BINNING DISK DRIVES DURING MANUFACTURING BY EVALUATING QUALITY METRICS PRIOR TO A FINAL QUALITY AUDIT

(75) Inventors: Ross E. Gough, Foothill Ranch, CA (US); Steven Neal Rivkin, Laguna Niguel, CA (US); Jan G. Abrahamsson, San Clemente, CA (US); Carl R. Messenger, Mission Viejo, CA (US); Arun Makhija, Fremont, CA (US); Gordon K. Rydquist, San Jose, CA (US); Michael J. Cullen, Discovery Bay, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 562 days.

(21) Appl. No.: 10/870,572

(22) Filed: Jun. 16, 2004

(51) Int. Cl.
*G06F 19/00* (2006.01)
(52) U.S. Cl. ......................... 702/81; 702/123
(58) Field of Classification Search .................. 702/81, 702/82, 84, 182; 360/69, 75; 700/95, 96, 700/110
See application file for complete search history.

(56) References Cited

U.S. PATENT DOCUMENTS

| 5,737,519 | A | 4/1998 | Abdelnour et al. |
| 6,408,406 | B1 | 6/2002 | Parris |
| 6,467,153 | B2 | 10/2002 | Butts et al. |
| 6,574,754 | B1 | 6/2003 | Smith |
| 6,601,053 | B1 | 7/2003 | Schaffer et al. |
| 6,651,192 | B1 | 11/2003 | Viglione et al. |
| 6,795,790 | B1 * | 9/2004 | Lang et al. .................. 702/123 |
| 6,954,326 | B2 * | 10/2005 | Bement et al. ............... 360/75 |
| 2003/0218818 | A1 | 11/2003 | Bement et al. |
| 2004/0044633 | A1 | 3/2004 | Chen |
| 2005/0044451 | A1 | 2/2005 | Fry et al. |

OTHER PUBLICATIONS

C. Apte, S.M. Weiss, G. Grout, "Predicting Defects in Disk Drive Manufacturing: A Case Study in High-Dimensional Classification", IEEE Annual Conference on AI Applications, CAIA-93, Mar. 1993.

(Continued)

*Primary Examiner*—Bryan Bui
(74) *Attorney, Agent, or Firm*—Howard H. Sheerin, Esq.

(57) ABSTRACT

A method of binning disk drives by evaluating quality metrics prior to a final quality audit is disclosed. A number of disk drives are assembled, and a plurality of quality metrics are generated for each disk drive representing a plurality of operating characteristics. The quality metrics for each disk drive are evaluated for binning the disk drives into a plurality of lots including a first lot and a second lot. A final quality audit (FQA) is performed by executing a number of write and read operations for a plurality of the disk drives in each lot and classifying each disk drive as passing or failing the FQA. If the number of disk drives that fail the FQA out of the first lot falls below a first threshold, the first lot is classified as acceptable for a first tier customer. If the number of disk drives that fail the FQA out of the second lot falls below a second threshold, the second lot is classified as acceptable for a second tier customer.

7 Claims, 9 Drawing Sheets

OTHER PUBLICATIONS

Bernhard Omer, "Genetic Algorithms for Neural Network Training on Transputers" Department of Computing Science, University of Newcastle upon Tyne, May 24, 1995.

G. F. Hughes, J. F. Murray, K. Kreutz-Delgado, C. Elkan, "Improved Disk Drive Failure Warnings," IEEE Transactions on Reliability Sep. 2002.

U.S. Appl. No. 10/231760 entitled "System and Method for Solving Optimization Problem Using a Neural-Network-Based Genetic Algorithm Technique" Pub. No. 2004/0044633, filed Mar. 2004, Chen.

C. Apte, S. M. Weiss, G. Grout, "Predicting Defects in Disk Drive Manufacturing: A Case Study in High-Demensional Classification", IEEE Annual Conference on AI Applications, CAIA-93, Mar. 1993.

Bernhard Omer, "Genetic Algorithms for Neural Network Training on Transputers" Department of Computing Science, University of Newcastle upon Tyne, May 24, 1995.

G. F. Hughes, J. F. Murray, K. Kreutz-Delgado, C. Elkan, "Improved Disk Drive Failure Warnings" IEEE Transactions On Reliability Sep. 2002.

* cited by examiner

FIG. 5A $f_1(x) = \log_{10}(x)$    $f_2(x) = \tanh(x)$

BINNING DISK DRIVES DURING MANUFACTURING BY EVALUATING QUALITY METRICS PRIOR TO A FINAL QUALITY AUDIT

BACKGROUND OF THE INVENTION

1. Field of the Invention

The present invention relates to disk drives for computer systems. More particularly, the present invention relates to binning of disk drives during manufacturing by evaluating quality metrics prior to a Final Quality Audit.

2. Description of the Prior Art

In disk drive manufacturing, drive failure prediction has in the past been concerned with identifying and preventing marginal disk drives from entering the market. A marginal disk drive may be discarded or reworked by replacing defective components and then re-tested. The testing procedure for detecting marginal disk drives (referred to as intelligent burn-in or IBI) involves vigorous operation of each disk drive over a range of temperature settings and testing conditions.

After the IBI process the disk drives are grouped into lots for shipping to particular customers. Prior to shipping, a final quality audit (FQA) is performed on a subset of disk drives within each lot. The FQA involves a subset of the test procedures performed during IBI and is used to help ensure the quality of disk drives within each lot satisfies the requirements of the customer. If the number of disk drives that fail FQA exceeds a predetermined threshold, it is assumed that statistically the field failure rate of the disk drives in the lot will be unacceptable and the entire lot is rejected.

The field failure rate limit for disk drives may differ depending on the target market. For example, a first tier customer such as a manufacture of personal computers (PCs) may desire a very low field failure rate to establish a reputation of high quality and reliability within the PC industry. Accordingly PC manufactures are willing to pay a premium for higher quality disk drives manufactured with higher quality components (e.g., higher quality heads, media, etc). In contrast, a second tier customer such as manufactures of personal video recorders (PVRs) may tolerate a higher field failure rate since the data stored on the disk drives (i.e., video streams) is typically less sensitive to catastrophic loss as compared to user data stored in a PC. Tolerating a higher field failure rate lowers the manufacturing cost of the PVR due to the price break given by the disk drive manufactures.

Although manufacturing disk drives using higher quality components decreases the number of marginal disk drives that fail FQA and therefore increases the manufacturing yield for first tier customers, the increased cost of using higher quality components reduces the net profit to the disk drive manufacturer.

There is, therefore, a need to reduce the manufacturing cost of disk drives while meeting the field failure rate requirements of both first and second tier customers.

SUMMARY OF THE INVENTION

The present invention may be regarded as a method of manufacturing disk drives. A number of disk drives are assembled, and a plurality of quality metrics are generated for each disk drive wherein the quality metrics correspond to a plurality of operating characteristics. The quality metrics for each disk drive are evaluated for binning the disk drives into a plurality of lots including a first lot and a second lot. A final quality audit (FQA) is performed by executing a number of write and read operations for a plurality of the disk drives in each lot and classifying each disk drive as passing or failing the FQA. If the number of disk drives that fail FQA out of the first lot falls below a first threshold, the first lot is classified as acceptable for a first tier customer. If the number of disk drives that fail the FQA out of the second lot falls below a second threshold, the second lot is classified as acceptable for a second tier customer.

In one embodiment, the first threshold is less than the second threshold. If the number of disk drives that fail the FQA out of the first lot falls between the first and second thresholds, the first lot is classified as acceptable for the second tier customer.

In another embodiment, the quality metrics for each disk drive are combined into a composite score, wherein the step of evaluating the quality metrics of each disk drive comprises the step of evaluating the composite score. In one embodiment, the composite score is compared to a binning threshold. In one embodiment, the binning threshold is selected relative to the number of disk drives allocated to each lot. In another embodiment, the binning threshold is adapted during the binning operation.

DESCRIPTION OF THE PREFERRED EMBODIMENTS

Figure 1A:
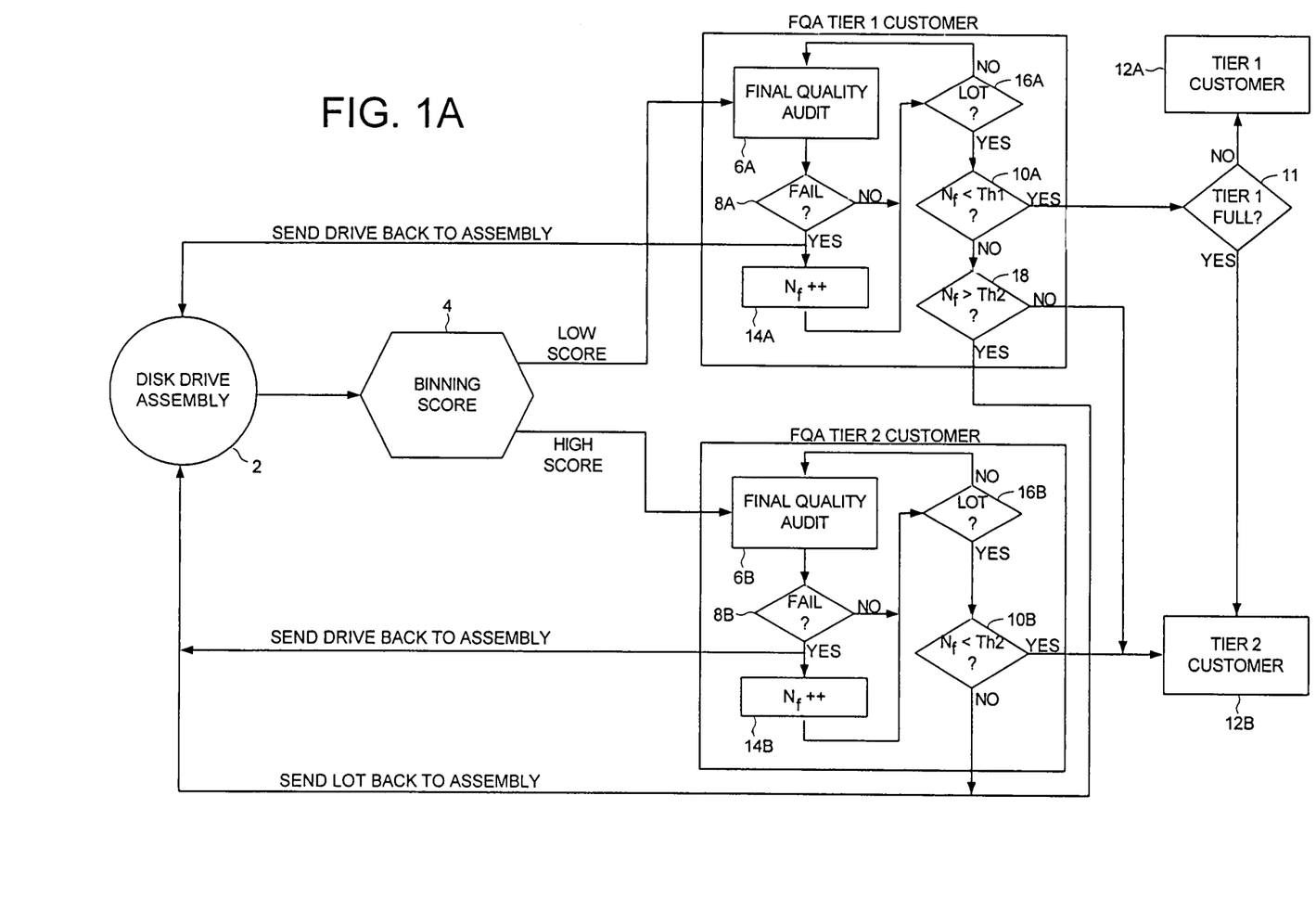
FIG. 1A is a flow diagram according to an embodiment of the present invention wherein a binning score is generated for a plurality of disk drives which is evaluated to bin the disk drives into respective lots.

FIG. 1A is a flow diagram according to an embodiment of the present invention for manufacturing disk drives. At step 2 a number of disk drives are assembled, and at step 4 a plurality of quality metrics are generated for each disk drive wherein the quality metrics correspond to a plurality of operating characteristics. The quality metrics for each disk drive are evaluated for binning the disk drives into a plurality of lots including a first lot and a second lot. At steps 6A and 6B a final quality audit (FQA) is performed by executing a number of write and read operations for a plurality of the disk drives in each lot and classifying each disk drive at steps 8A and 8B as passing or failing the FQA. If at step 10A the number of disk drives that fail the FQA out of the first lot falls below a first threshold Th1, the first lot is classified as acceptable for a first tier customer 12A. If at step 10B the number of disk drives that fail the FQA out of the second lot falls below a second threshold Th2, the second lot is classified as acceptable for a second tier customer 12B.

In one embodiment, a subset of disk drives within each lot are selected for FQA testing. If a disk drive fails FQA at steps 8A or 8B, the disk drive is sent back to the disk drive assembly 2 for evaluation/rework and a counter $N_f$ is incremented at steps 14A or 14B. The FQA is executed for each disk drive in the subset until at steps 16A and 16B the entire subset of disk drives have been tested. In one embodiment, the first threshold Th1 is greater than the second threshold Th2 meaning that the second tier customer 12B will accept a higher field failure rate than the first tier customer 12A. The first and second threshold may be set to any suitable value, and may be as low as one failure for the first tier customer 12A. In other words, the entire lot of disk drives may be rejected by the first tier customer 12A if a single drive fails the FQA 6A.

In the embodiment of FIG. 1A, a lot of disk drives that are considered acceptable for a first tier customer may be allocated to a second tier customer if appropriate. For example, if at step 11 a sufficient number of disk drives have already been allocated to the first tier customer 12A, the lot is allocated to the second tier customer 12B. Another aspect illustrated in the embodiment of FIG. 1A is to "waterfall" a lot of disk drives that are rejected by the first tier customer 12A to the second tier customer 12B. That is, if at step 18 the number of disk drives that fail the FQA 6A out of the first lot falls between the first and second thresholds Th1 and Th2, the second lot is classified as acceptable for the second tier customer 12B. Otherwise the entire lot is sent back to the disk drive assembly 2 for rework. Any suitable number of tiered customers may be employed in the present invention wherein the lots of disk drives will waterfall down toward lower tier customers until finally being sent back to the assembly step 2 for rework if the lot is rejected by all of the tiered customers.

Binning the disk drives into respective lots based on a binning score reduces the number of lots rejected by each of the tiered customers, thereby increasing the manufacturing yield and reducing manufacturing cost by reducing the number of lots returned to the disk drive assembly 2 for rework. In one embodiment, the present invention obviates the need to use higher quality components in disk drives targeted for higher tier customers. In this embodiment, all of the disk drives are manufactured with the same quality of components and the disk drives that generate a higher binning score at step 4 of FIG. 1A are grouped into the lots targeted for higher tier customers. In other words, the disk drives having a lower tendency for field failure are grouped into the lots for the higher tier customers which compensates for the need to manufacture the disk drives with higher quality components. This reduces the manufacturing costs while still meeting the quality requirements of higher tier customers.

Figure 1B:
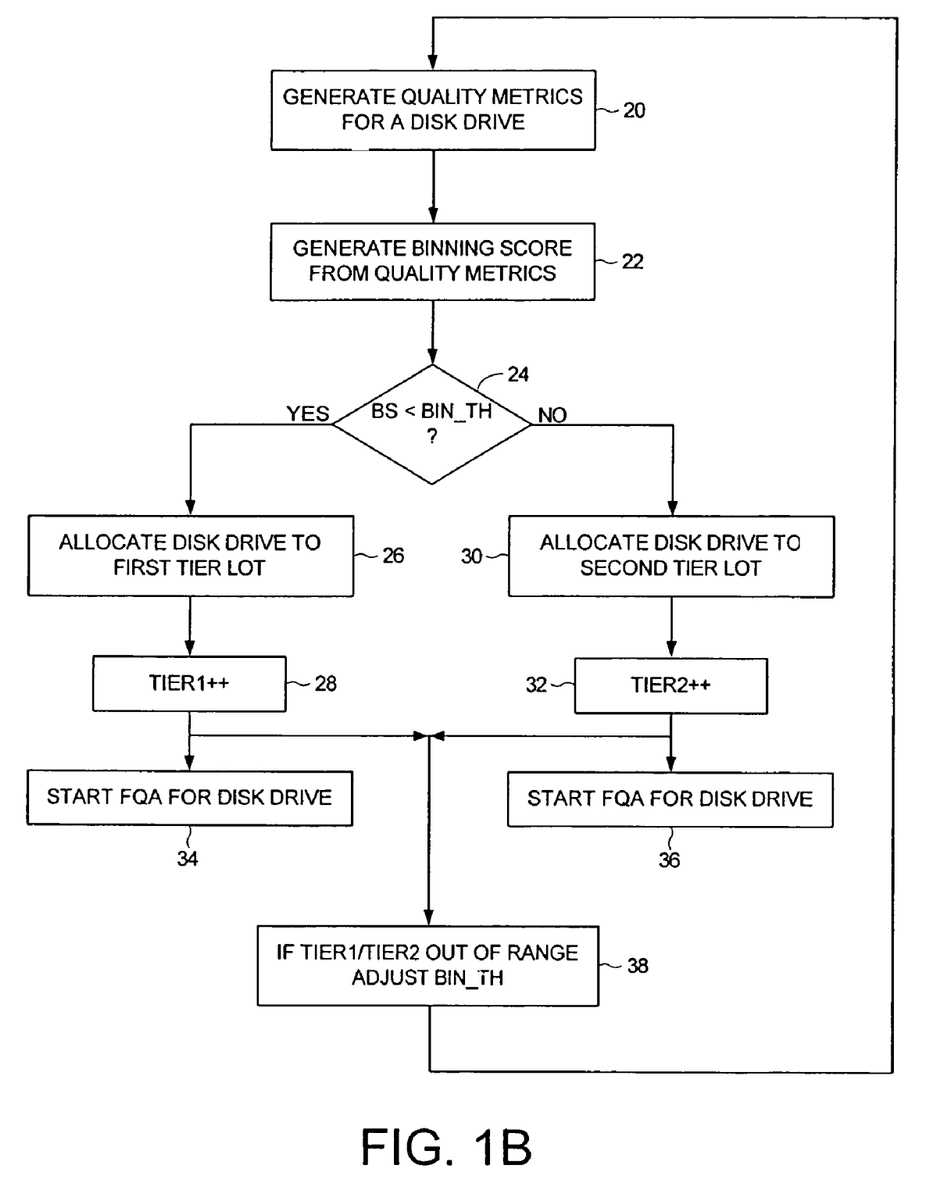
FIG. 1B is a flow diagram according to an embodiment of the present invention wherein a binning threshold for binning the disk drive is adapted relative to the number of disk drives allocated to each lot.

In one embodiment, a binning threshold used for binning the disk drives into respective lots is selected relative to the number of disk drives allocated to each lot to ensure that the disk drives are distributed in a desired ratio amongst each tier customer. For example, if the binning threshold is too high, not enough disk drives will be allocated to the lots for the first tier customer. In one embodiment illustrated in the flow diagram of FIG. 1B the binning threshold is continuously monitored and adapted during the binning operation. At step 20 a number of quality metrics are generated for a disk drive, and at step 22 a binning score is generated based on the quality metrics. In this embodiment, the binning score represents a probability that the disk drive will fail FQA. If at step 24 the binning score is less than the binning threshold (BIN_TH) indicating a low probability of failure, then at step 26 the disk drive is allocated to a first tier lot and at step 28 a counter TIER1 is incremented. If at step 24 the binning score is greater than the binning threshold indicating a higher probability of failure, then at step 30 the disk drive is allocated to a second tier lot and at step 32 a counter TIER2 is incremented. At step 34 or 36 the FQA is started for the disk drive and at step 38 a ratio of the counters TIER1/TIER2 is evaluated to adjust the binning threshold if needed.

Any suitable quality metrics may be employed in the present invention for generating the binning score at step 4 of FIG. 1A. Example quality metrics may include head/disk interface characteristics (e.g., head fly height measurement, thermal asperity detection, etc.), read channel settings (e.g., gain control, timing recovery, equalizer settings, etc), error correction parameters (e.g., number of retries, on-the-fly ECC errors, off-line error correction, etc.), servo control parameters (e.g., seeking errors, tracking errors, etc.), and the like. Also, any suitable algorithm may be employed at step 4 of FIG. 1A for evaluating the quality metrics to generate the binning score used for binning the disk drives into their respective lots. In one embodiment, a genetic algorithm is used to select a subset of the quality metrics that are the best indicators of drive failure. A drive failure prediction algorithm is then used to evaluate the selected quality metrics to generate the binning score.

Figure 2:
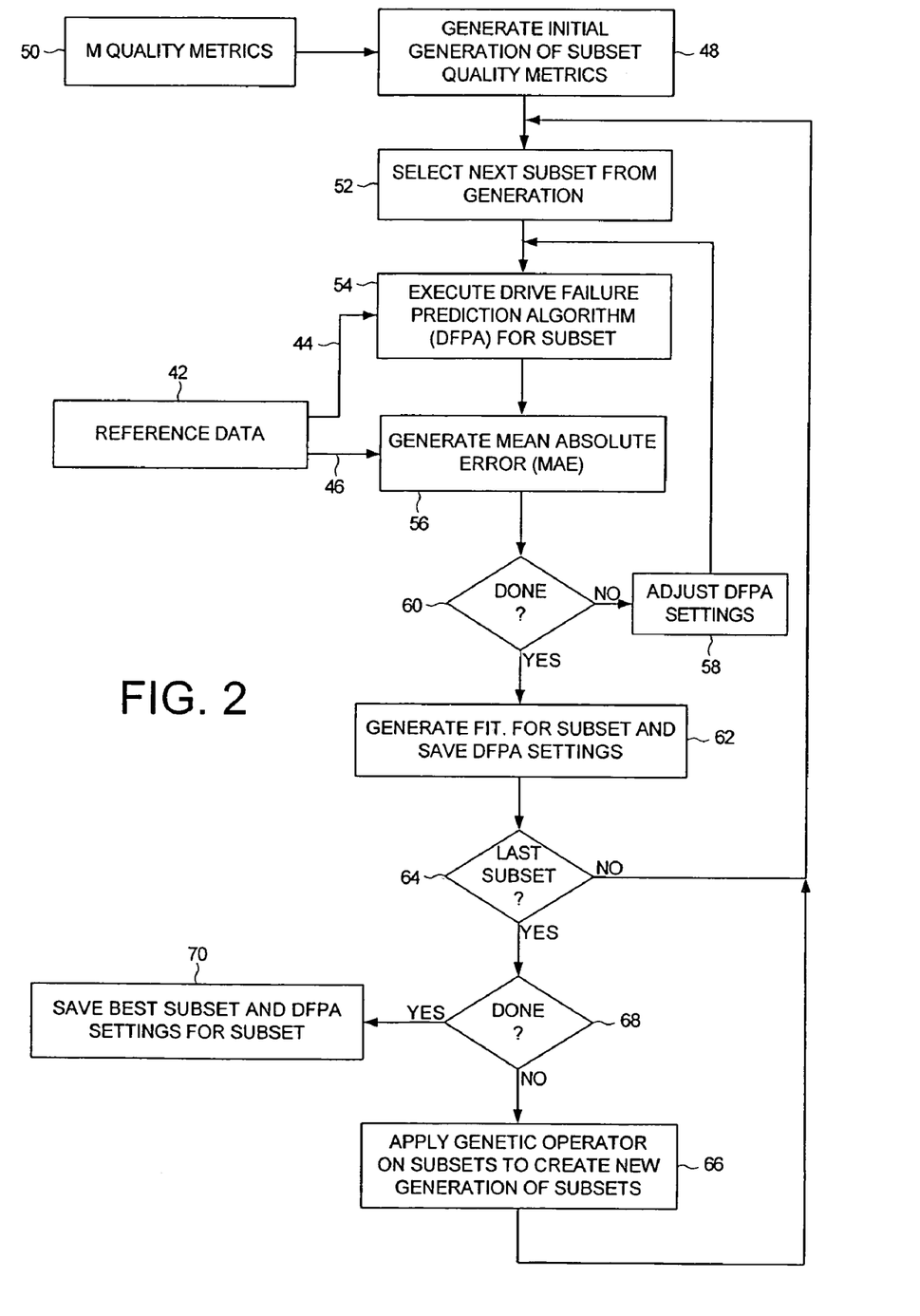
FIG. 2 is a flow diagram according to an embodiment of the present invention wherein an adaptive drive failure prediction algorithm (DFPA) and a genetic algorithm are used to identify the subset of quality metrics and corresponding DFPA settings that are the best indicators of drive failure.

FIG. 2 is a flow diagram illustrating the embodiment of the present invention wherein a genetic algorithm is used to select the subset of quality metrics that are the best indicators of drive failure. At step 42, a reference data base of quality metric values 44 and a corresponding failure indicator 46 is generated for a subset of disk drives out of a family of disk drives. The reference data base may be generated, for example, by evaluating the subset of disk drives using a manufacturing test that identifies failed disk drives as well as the corresponding quality metrics. At step 48 an initial generation of subset quality metrics is selected from a group of M quality metrics 50, wherein each subset comprises N<M quality metrics and each quality metric can take on one of a number of quality metric values representing a quality of a disk drive. At step 52 a subset of quality metrics is selected from the generation, and at step 54 a drive failure prediction algorithm (DFPA) is executed for the selected subset using the quality metric values 44 stored in the reference data base 42. At step 56 a mean absolute error (MAE) is generated for the selected subset, wherein the MAE represents an accuracy of the drive failure prediction algorithm relative to the failure indicators 46 stored in the reference data base 42. At step 58, at least one setting of the DFPA is adjusted and the flow diagram starting at step 54 is repeated until a predetermined criteria is satisfied at step 60. Any suitable DFPA may be employed, and in an embodiment described below, the DFPA comprises a neural network wherein the weights of the processing elements in the neural network are adjusted at step 58.

At step 62 a fitness score is generated for the selected subset in response to the current MAE, and the corresponding DFPA settings are saved. If at step 64 there are more subsets to evaluate, the flow diagram is repeated starting at step 52 by selecting another subset from the generation. Once a fitness score has been generated for each subset, at step 66 at least one genetic operator is applied to the subsets in response to the fitness scores to generate a new generation of subsets, wherein the genetic operator is selected from the group consisting of a crossover operator, a mutation operator, and a replication operator. The flow diagram is then repeated starting at step 52 until a predetermined criteria is satisfied at step 68. At step 70 the subset of quality metrics that generated the best fitness score and the corresponding DFPA settings for the subset are saved. The saved subset of quality metrics and DFPA settings are then used in the DFPA to predict failure of disk drives in a manufacturing line or while in the field.

A genetic algorithm attempts to find a global maximum (best solution or best fitness score) to a problem using Darwinian-type survival of the fittest type strategy whereby potential solutions to the problem compete and "mate" with each other in order to produce increasingly better solutions. In the context of finding the subset of quality metrics that are the best indicators of drive failure, each subset of quality metrics can be considered as a chromosome wherein the quality metrics represents the gene pool for the chromosomes. Comparing the output of the DFPA (step 56 of FIG. 2) to the failure indicators 46 in the reference data base 42 is the means for measuring the fitness for each chromosome of quality metrics. The genetic operators are then applied to the chromosomes having the highest fitness score (at step 66) to generate a new set of chromosomes that eventually "evolve" toward the optimal solution.

Figure 3A:
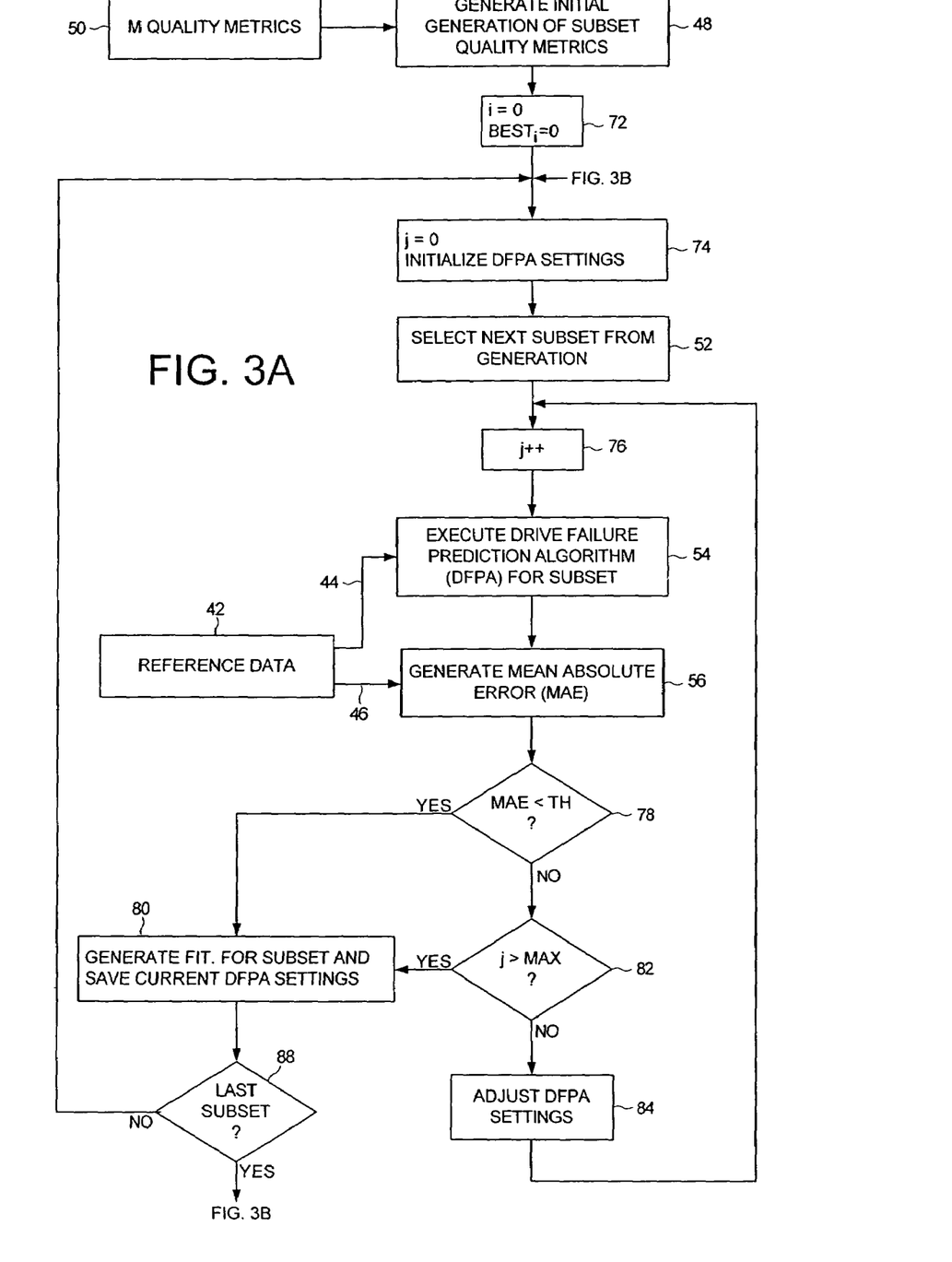
FIGS. 3A-3B show a flow diagram according to an embodiment of the present invention wherein a number of iterations are performed to adjust the DFPA settings for each subset in a generation, and a number of iterations are performed to evolve the subsets using the genetic algorithm.
Figure 3B:
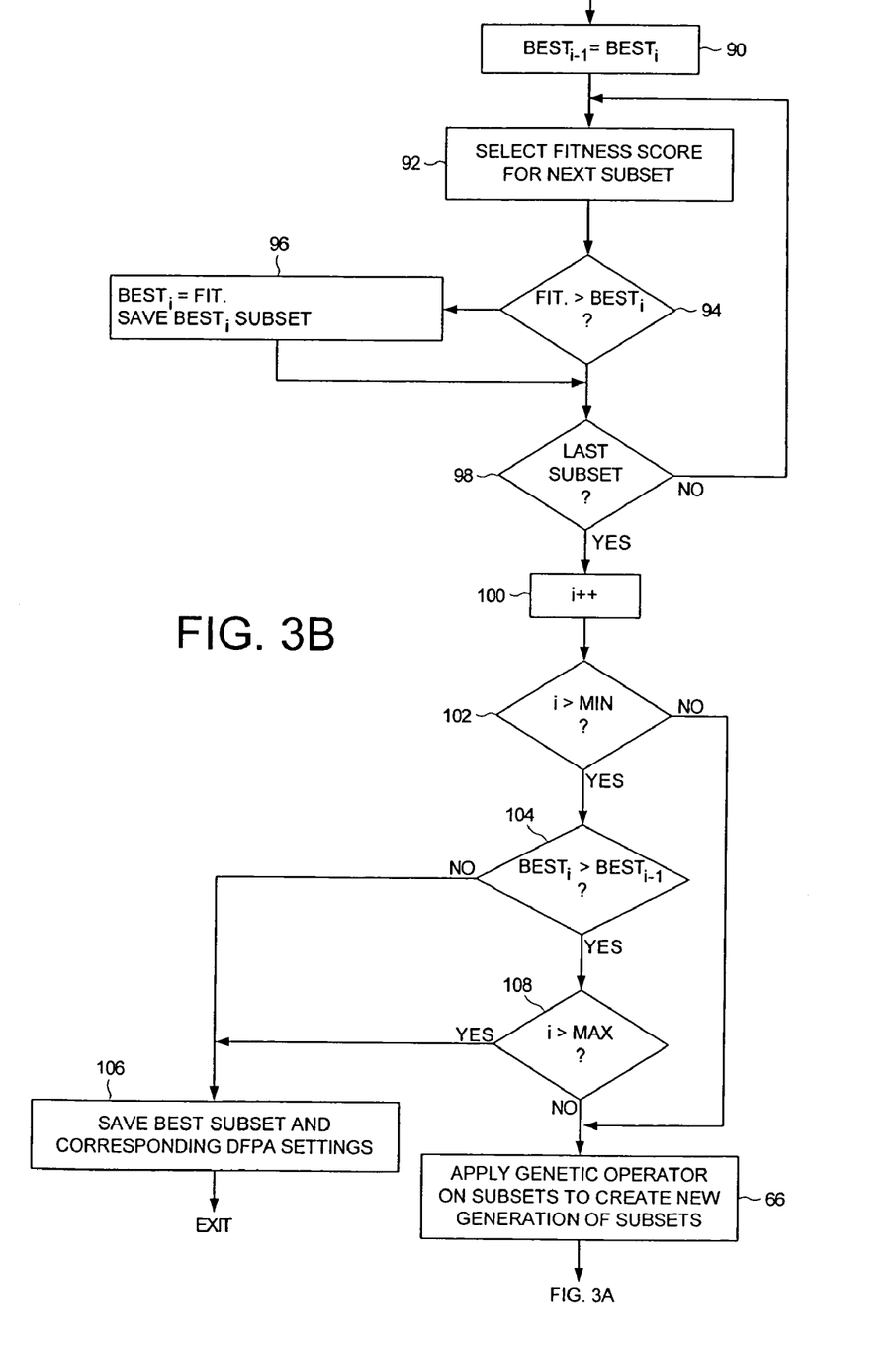

FIGS. 3A-3B show a flow diagram according to an embodiment of the present invention wherein FIG. 3A shows a number of iterations are performed to adjust the DFPA settings for each subset in a generation until the MAE falls below a threshold or a maximum number of iterations is reached. FIG. 3B shows a minimum number of iterations are performed to evolve the subsets using the genetic algorithm. If after executing the minimum number of iterations the fitness score is not trending upward toward a new maximum, the genetic algorithm terminates. The genetic algorithm may also terminate if a maximum number of iterations is reached.

Referring to FIG. 3A, at step 72 an iteration counter i and a variable $BEST_i$ are initialized to zero, wherein the iteration counter i counts the number of iterations for the genetic algorithm, and the variable $BEST_i$ stores the best fitness score out of the subset of quality metrics in the current generation. At step 74 an iteration counter j is initialized to zero, wherein the iteration counter j counts the number of iterations for training the DFPA. The DFPA settings are also initialized at step 74 (e.g., setting the weights of a neural network to default values). At step 52 a subset of quality metric is selected from the current generation, and at step 76 the iteration counter j is incremented. At step 54 the DFPA algorithm is executed for the selected subset, and a corresponding MAE generated at step 56. If at step 78 the MAE is not less than a threshold and at step 82 the iteration counter j is less than a maximum, then at step 84 at least one DFPA setting is adjusted and the flow diagram is repeated starting at step 76. If at step 78 the MAE is less than the threshold, or at step 82 the iteration counter j is greater than the maximum, then at step 80 a fitness score is generated for the current subset in response to the MAE, and the current DFPA settings are saved. The flow diagram of FIG. 3A is repeated until at step 88 a fitness score and DFPA settings have been saved for each subset in the current generation, wherein flow control transfers to FIG. 3B.

At step 90 of FIG. 3B the current $BEST_i$ fitness score is saved into a variable $BEST_{i-1}$. At step 92 the best fitness score for a subset in the generation (saved at step 80 of FIG. 3A) is selected and compared at step 94 to $BEST_i$. If the fitness score is greater than $BEST_i$, then at step 96 the fitness score is assigned to $BEST_i$, and the selected subset is saved. If at step 98 there are more subsets to evaluate, then the flow diagram repeats starting with step 92. Once the best fitness score for each subset has been evaluated, at step 100 the iterations counter i is incremented. If at step 102 the number of genetic evolution iterations does not exceed a minimum, then at step 66 at least one genetic operator is applied to the subsets in response to the best fitness scores for the current subsets to generate a new generation of subsets and control transfers to step 74 of FIG. 3A to perform DFPA training on the new generation of subsets. If at step 102 the number of genetic evolution iterations exceeds the minimum, and at step 104 the current $BEST_i$ variable is not greater than the previous iteration $BEST_{i-1}$ (saved at step 90), it indicates that the fitness score is not trending toward a new maximum and the genetic algorithm therefore terminates at step 106 after saving the subset and corresponding DFPA settings that generated the best overall fitness score. The genetic algorithm also terminates at step 106 if at step 108 the number of genetic evolution iterations has exceeded a maximum.

Figure 4:
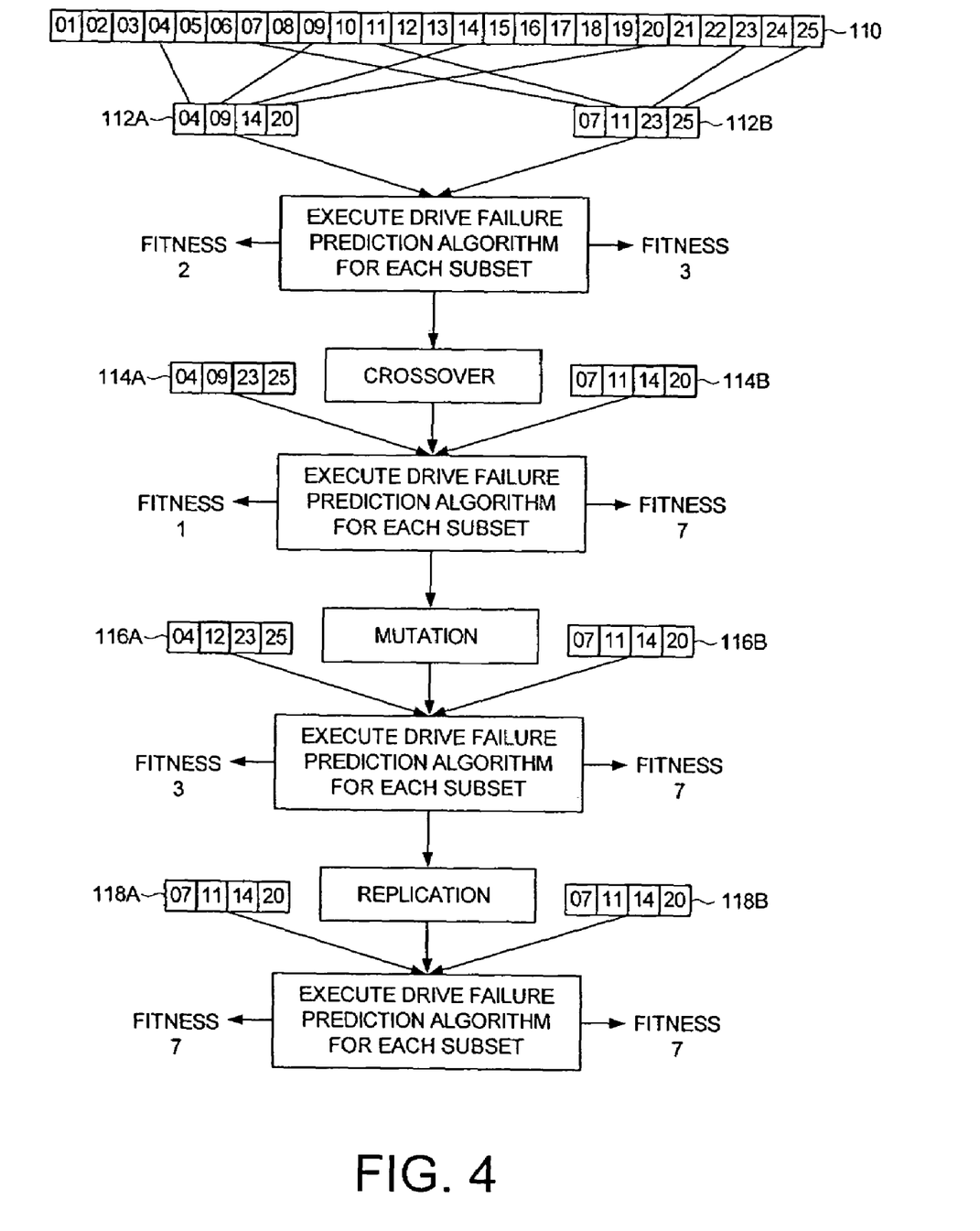
FIG. 4 illustrates an embodiment of the present invention wherein a plurality of genetic operators employed by the genetic algorithm includes crossover, mutation, and replication.

The process of genetic evolution is illustrated in FIG. 4 wherein an initial generation of quality metric subsets (chromosomes) are selected from an available pool of 25 quality metrics 110 numbered 1-25. In this example, two subsets 112A and 112B of four quality metrics are generated by randomly selecting four quality metrics from the pool 110. The first subset 112A comprises quality metrics {04, 09, 14, 20} and the second subset 112B comprises quality metrics {07, 11, 23, 25}. Any suitable number of subsets of any suitable length may be generated to create the initial generation of subsets; the example of FIG. 4 uses two subsets of length four for the purpose of illustration. The DFPA is executed to generate a fitness score for each subset. The crossover operator is then applied to the subsets 112A and 112B to generate a new generation of subsets 114A and 114B. In this example, the crossover operator is performed on the last two quality metrics of subsets 112A and 112B, that is, quality metrics {14, 20} of subset 112A are crossed over with quality metrics {23, 25} of subset 112B. The DFPA is then executed to generate a fitness score for each of the new generation of subsets 114A and 114B. The mutation operator is then applied to the subsets 114A and 114B to generate a new generation of subsets 116A and 116B. In this example, the mutation operator mutates the second quality metric in subset 114A, that is, quality metric {09} in subset 114A is mutated to {12}. The DFPA is again executed to generate a fitness score for each of the new generation of subsets 116A and 116B. The replication operator is then applied to the subsets 116A and 116B to generate a new generation of subsets 118A and 118B. In this example, the replication operator replicates the second subset 116B as the first subset 118B. The drive failure prediction algorithm is again executed to generate a fitness score for each of the new generation of subsets 118A and 118B.

Figure 5A:
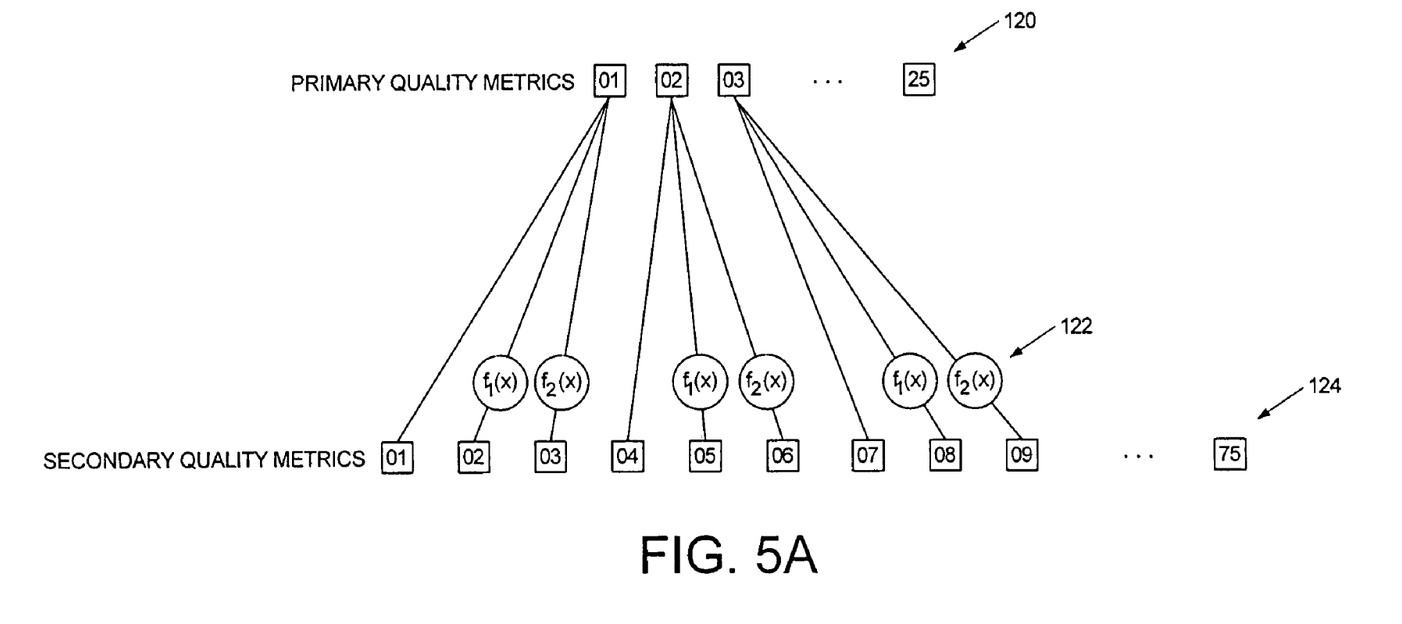
FIG. 5A shows an embodiment of the present invention wherein the plurality of quality metrics is generated by computing secondary quality metrics from primary quality metrics according to a first and second predetermined functions.
Figure 5B:
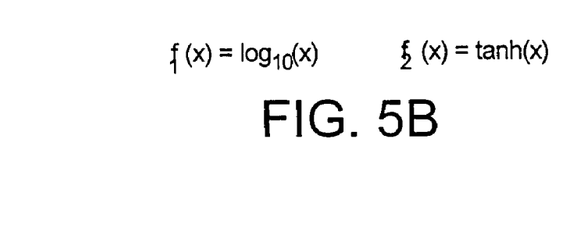
FIG. 5B illustrates that in one embodiment the first and second predetermined functions are the logarithm base 10 and hyperbolic tangent functions.

FIG. 5A shows an embodiment of the present invention wherein the group of M quality metrics 50 (FIG. 2) comprises a primary set of quality metrics 120 and at least one predetermined function 122 operating on the primary set of quality metrics 120 to generate a secondary set of quality metrics 124. In an embodiment shown in FIG. 5B, the predetermined function 122 comprises a logarithm base 10 function and a hyperbolic tangent function. Thus in FIG. 5A there are 25 quality metrics in the primary set 120 and 75 quality metrics in the secondary set 124 after applying the logarithm base 10 function and a hyperbolic tangent function on the primary set 120.

Figures 6A, 6B:
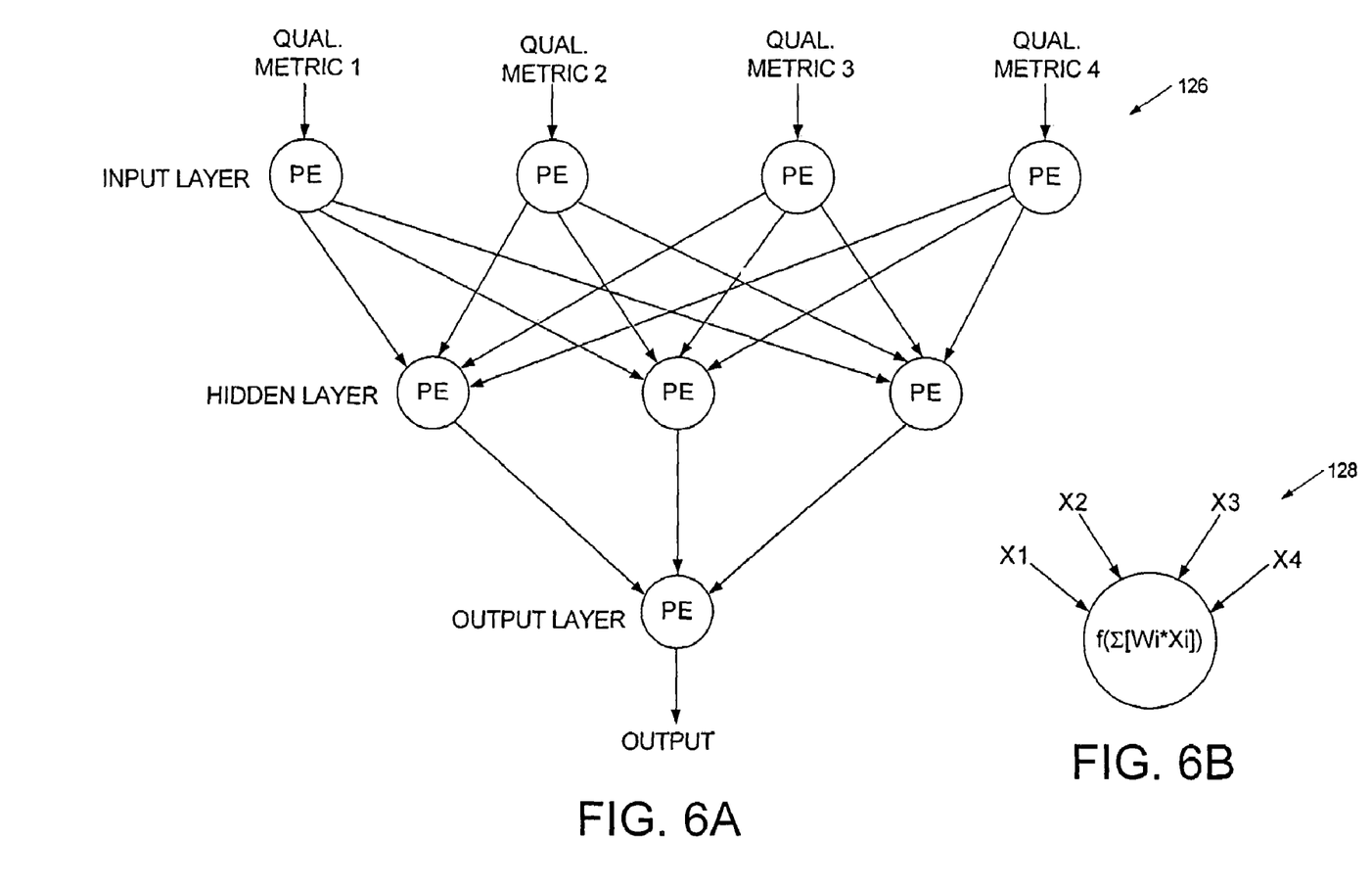
FIG. 6A shows an embodiment of the present invention wherein the drive failure prediction algorithm employs a neural network comprising a plurality of processing elements.
FIG. 6B shows an embodiment of each processing element in the neural network.

Any suitable DFPA may be employed in the embodiments of the present invention. FIG. 6A shows an embodiment wherein the DFPA employs a neural network 126 comprising an input layer, a hidden layer, and an output layer. Each layer comprises a number of processing elements (PE) which are interconnected between the layers to form a directed graph. Each PE implements any suitable function on the inputs. FIG. 6B shows an embodiment of a PE 128 wherein the function is simply the summation of the inputs Xi scaled by a respective weight Wi. In one embodiment the neural network is optimized (step 58 of FIG. 2) by adapting (i.e., training) the weights Wi to improve the accuracy of the DFPA as determined from the reference data base 42 of quality metric values and corresponding failure indicators 46. The output of the neural network is a composite score representing the propensity of drive failure based on the combined influence of multiple quality metrics (four in the embodiments shown). The output of the neural network is evaluated at step 56 of FIG. 2 to generate the fitness score used by the genetic algorithm to select the subset of quality metrics that are the best indicators of drive failure. The output of the neural network may also be used to predict drive failure during manufacturing (e.g., to generate the binning score 4 in FIG. 1A) or while in-the-field.

Figure 7:
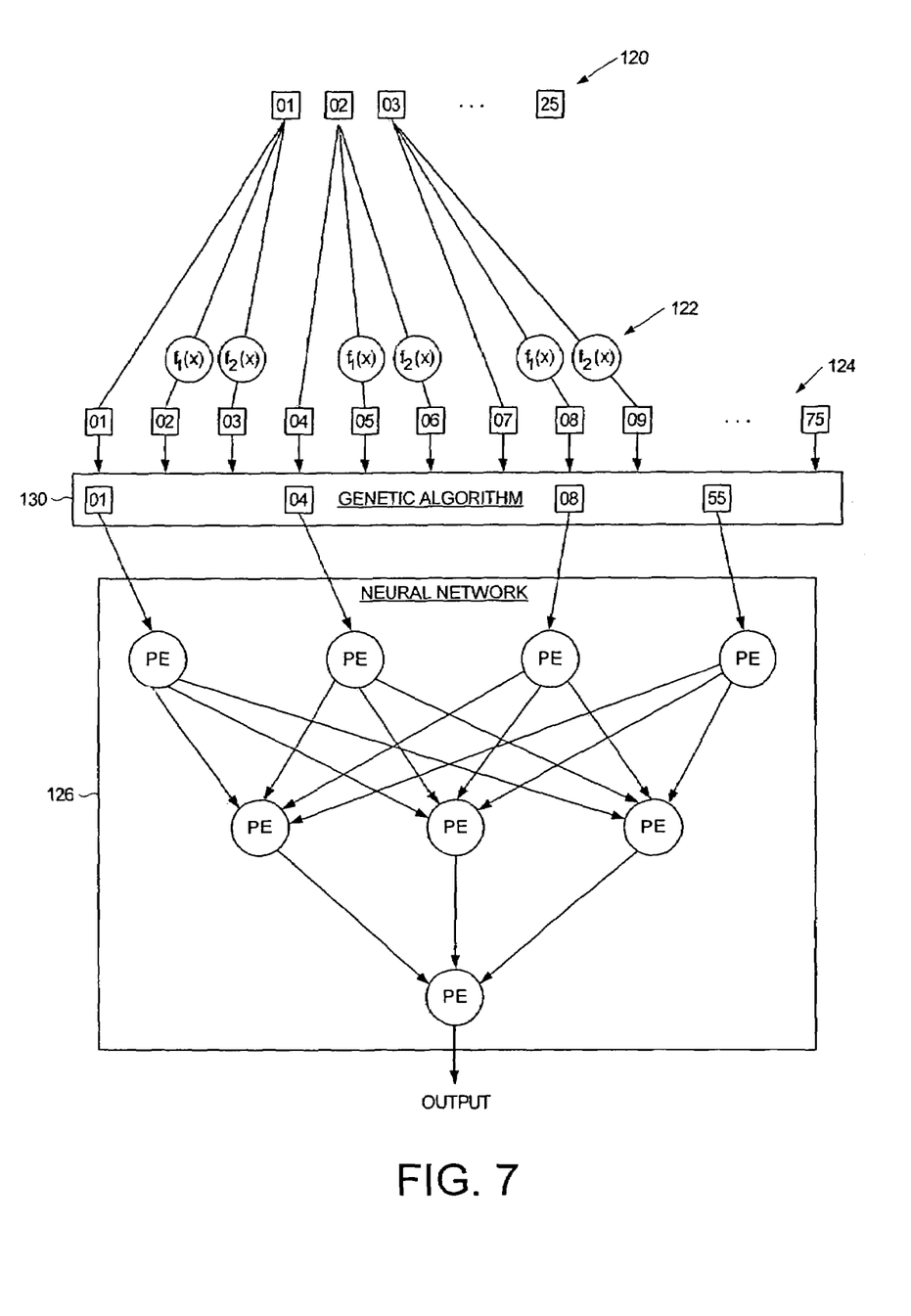
FIG. 7 illustrates the combined aspects of an embodiment of the present invention, including to select a subset of quality metrics using a genetic algorithm for input into a neural network implementing the DFPA.

FIG. 7 shows an overview of the embodiment of the present invention using a genetic algorithm to select the subset of quality metrics that are the best indicators of drive failure. At least one function 122 operates on the primary set of quality metrics 120 to generate a secondary set of quality metrics 124. The secondary set of quality metrics 124 are evaluated by the genetic algorithm 130 to select a subset of the quality metrics that are the best indicators of drive failure. The selected subset of quality metrics are then input into a neural network 126, the output of which is a composite score used to generate the fitness score for the genetic algorithm 130 and to predict drive failure during manufacturing (e.g., to generate the binning score 4 in FIG. 1A) or while in-the-field.

We claim:

1. A method of manufacturing disk drives comprising the steps of:
    (a) assembling a number of disk drives;
    (b) generating a plurality of quality metrics for each disk drive, wherein the quality metrics correspond to a plurality of operating characteristics;
    (c) evaluating the quality metrics for each disk drive for binning the disk drives into a plurality of lots including a first lot and a second lot;
    (d) performing a final quality audit (FQA) by executing a number of write and read operations for a plurality of the disk drives in each lot and classifying each disk drive as passing or failing the FQA;
    (e) if the number of disk drives out of the first lot that fail the FQA falls below a first threshold, classifying the first lot as acceptable for presenting to a first tier customer; and
    (f) if the number of disk drives out of the second lot that fail the FQA falls below a second threshold, classifying the second lot as acceptable for presenting to a second tier customer.

2. The method of manufacturing disk drives as recited in claim 1, wherein the first threshold is less than the second threshold.

3. The method of manufacturing disk drives as recited in claim 2, wherein if the number of disk drives that fail the FQA out of the first lot falls between the first and second thresholds, classifying the first lot as acceptable for presenting to the second tier customer.

4. The method of manufacturing disk drives as recited in claim 1, further comprising the step of combining the quality metrics for each disk drive into a composite score representing an overall quality metric for each disk drive, wherein the step of evaluating the quality metrics of each disk drive comprises the step of evaluating the composite score.

5. The method of manufacturing disk drives as recited in claim 4, wherein the step of evaluating the composite score of each disk drive for binning the disk drives comprises the step of comparing the composite score to a binning threshold.

6. The method of manufacturing disk drives as recited in claim 5, further comprising the step of selecting the binning threshold relative to the number of disk drives allocated to each lot.

7. The method of manufacturing disk drives as recited in claim 6, wherein the binning threshold is adapted during the binning operation.

* * * * *